(12) United States Patent
Havens

(10) Patent No.: US 6,308,876 B1
(45) Date of Patent: Oct. 30, 2001

(54) GAME CALL CARRYING SYSTEM

(76) Inventor: Glendon Scott Havens, 1011 Shadow Cir., League City, TX (US) 77573

( * ) Notice: Subject to any disclaimer, the term of this patent is extended or adjusted under 35 U.S.C. 154(b) by 0 days.

(21) Appl. No.: 09/326,461

(22) Filed: Jun. 7, 1999

(51) Int. Cl.[7] .................................................. A45F 5/00
(52) U.S. Cl. ..................... 224/661; 224/222; 224/240; 224/251; 224/679
(58) Field of Search ................................. 224/235, 240, 224/251, 679, 661, 222, 256, 250, 267; 446/397

(56) References Cited

U.S. PATENT DOCUMENTS

| | | | |
|---|---|---|---|
| D. 329,140 | * | 9/1992 | Maricle .................... 224/235 |
| 2,081,930 | * | 6/1937 | Hoffman .................. 224/235 |
| 3,079,037 | * | 2/1963 | Schechter ................. 220/630 |
| 3,246,786 | * | 4/1966 | Holley ..................... 215/393 |
| 4,047,329 | * | 9/1977 | Holt ........................ 220/630 |
| 4,088,250 | * | 5/1978 | Schaefer .................. 224/235 |
| 4,303,187 | * | 12/1981 | Berman .................... 224/222 |
| 4,330,073 | * | 5/1982 | Clark ...................... 224/240 |
| 4,733,808 | * | 3/1988 | Turner, Jr. et al. ........ 224/267 |
| 4,955,845 | * | 9/1990 | Piper ....................... 446/397 |
| 5,244,430 | * | 9/1993 | Legursky ................. 224/267 |
| 5,263,838 | * | 11/1993 | Meuser et al. ............ 224/250 |
| 5,445,303 | * | 8/1995 | Cawile, Jr. ............... 224/222 |
| 5,607,091 | * | 3/1997 | Musacchia ............... 224/222 |
| 5,820,000 | * | 10/1998 | Timberlake et al. ...... 224/267 |
| 5,947,353 | * | 9/1999 | Johnson .................. 224/267 |
| 5,988,469 | * | 11/1999 | Musacchia ............... 224/222 |

\* cited by examiner

*Primary Examiner*—Gary E. Elkins

(57) ABSTRACT

A tubular receptacle for storing, transporting and carrying a variety of turkey game calls including the box call, push button yelper and the slate/glass call, either independently or in combination. The tube is made of sturdy plastic or other rigid material and has a permanent bottom end and slip on end cap to provide a means of closure. The tube is lined with a cushioned material which holds the game call in place, preventing movement of the game call while inserted inside the tube. The rigidity of the tube helps to prevent damage to the game call from external blows such as being dropped or being sat on. The material used for the tube and end cap is waterproof and protects the game call from the effects of inclimate weather. When inserted in the tube, a game call is protected while in storage in a closet or gun chest, during transportation to and from hunts and during use in the field. The tube can be carried hands free by a hunter in the field utilizing belt loops or a spring clip attached to the tube, for vertical or horizontal waistband carrying. The tube can also be carried free from obstruction of below the waist heavy coats, when attached to an elongated belt looped strap which runs down the outside of the thigh, and to one or more straps wrapped around the thigh, which are attached directly to the tube or to a fitted sleeve which the tube is inserted into.

20 Claims, 3 Drawing Sheets

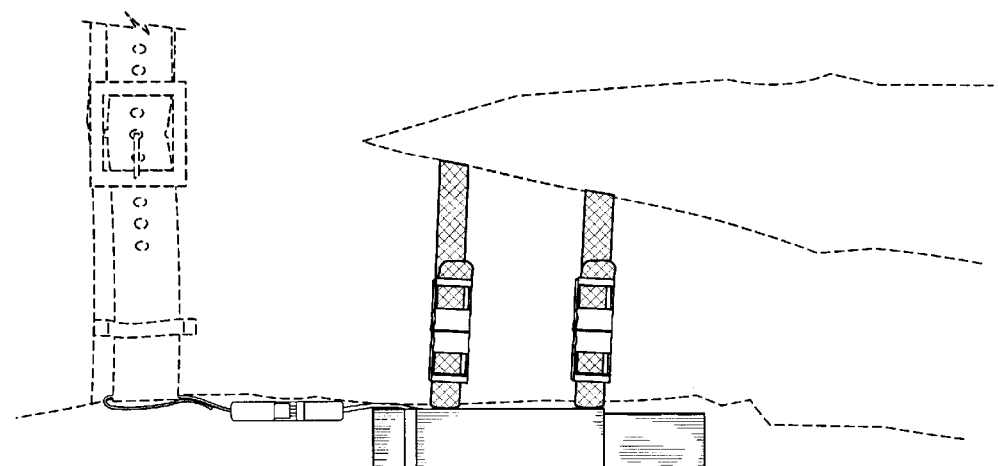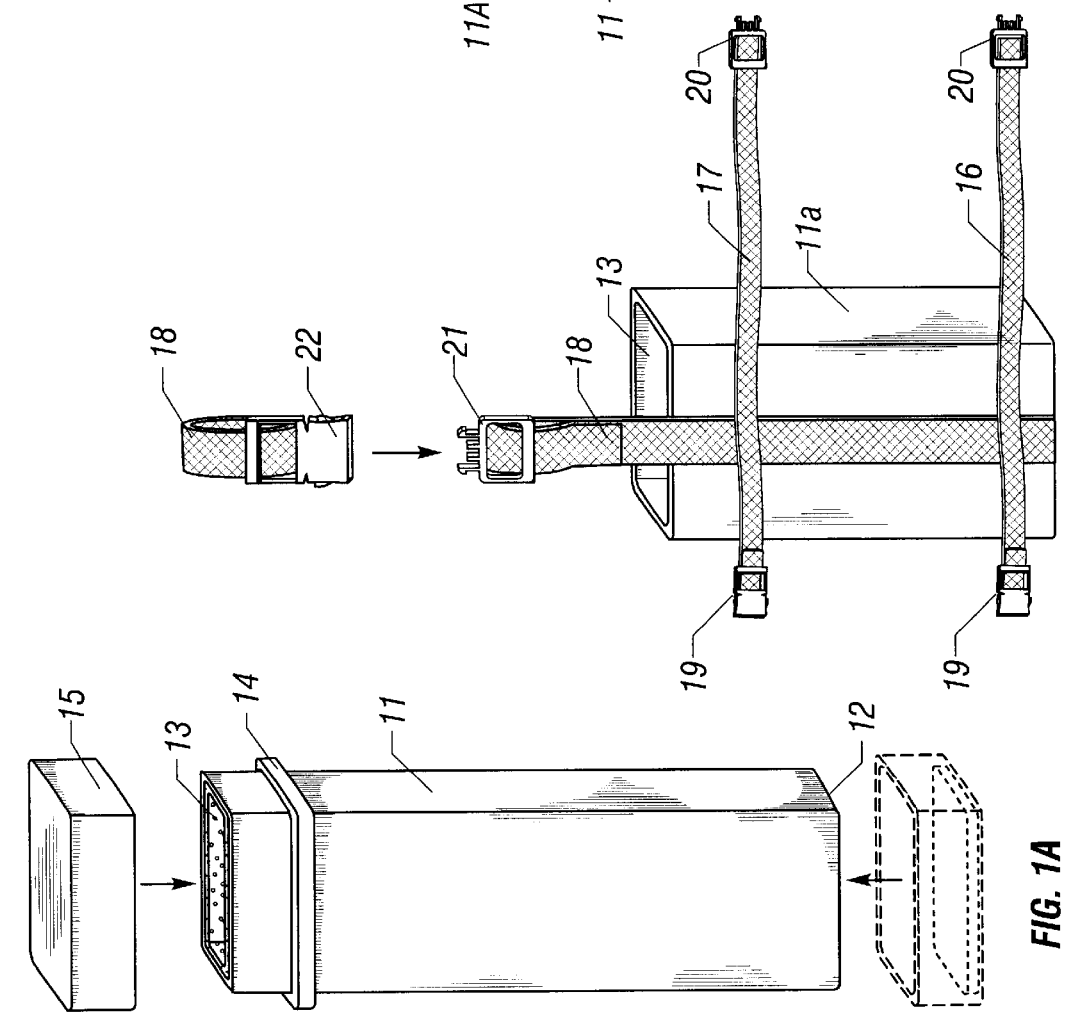

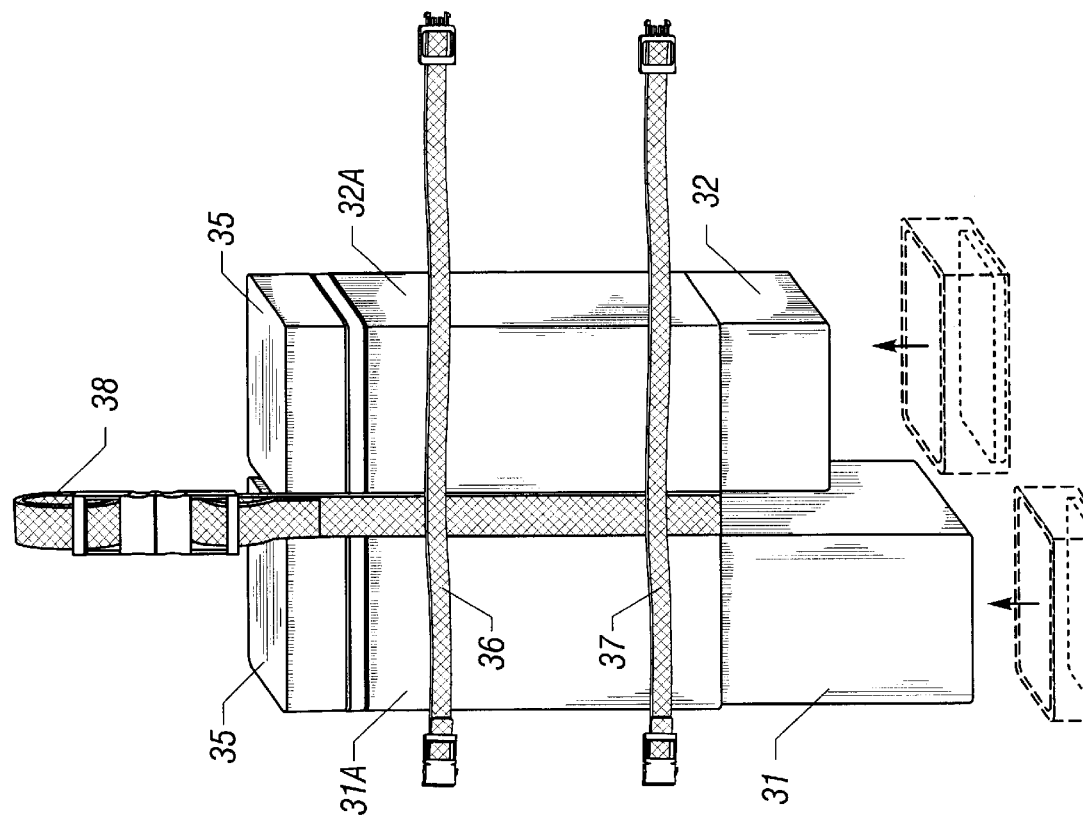
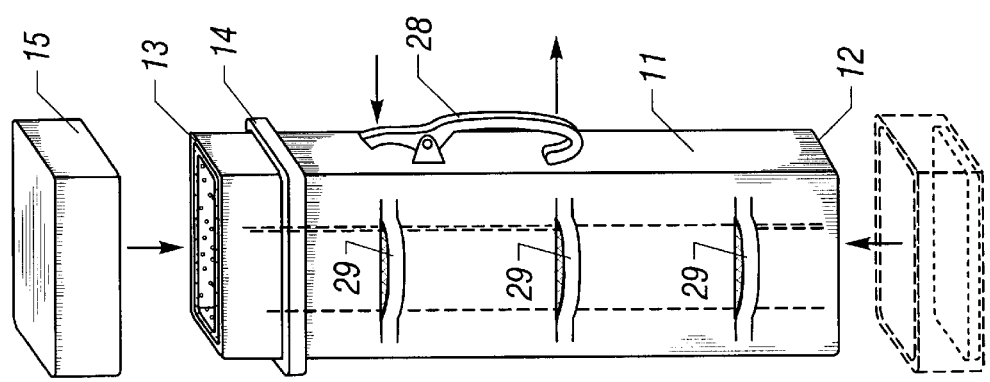

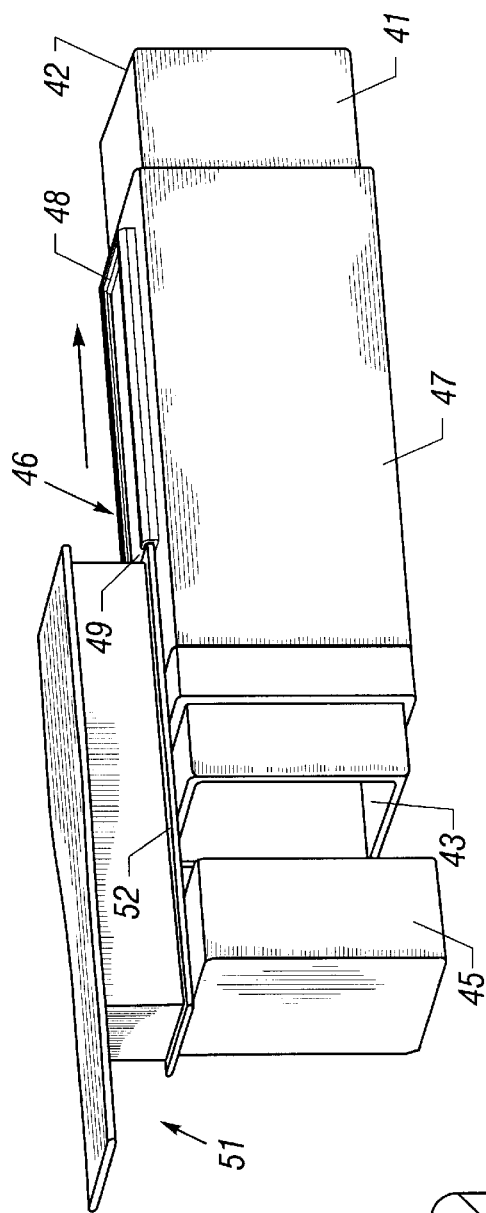
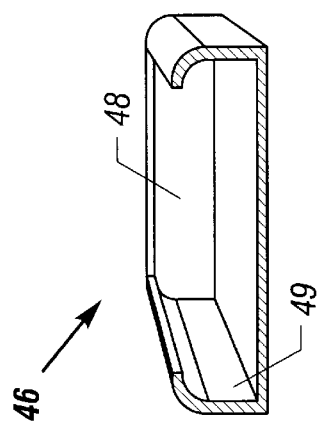
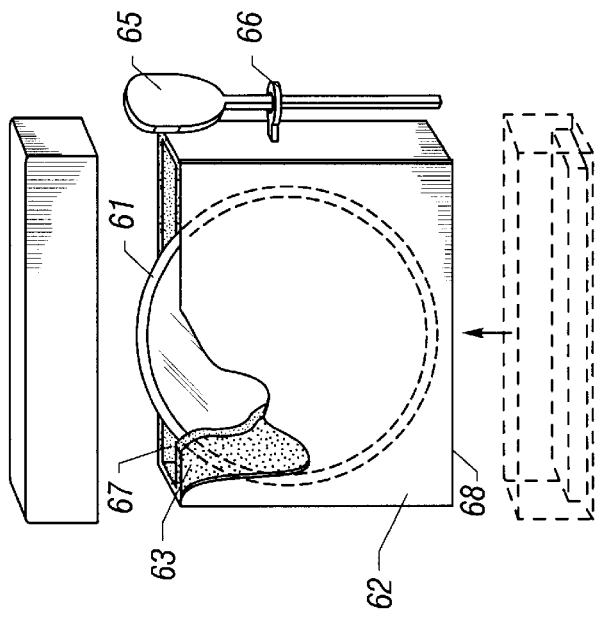
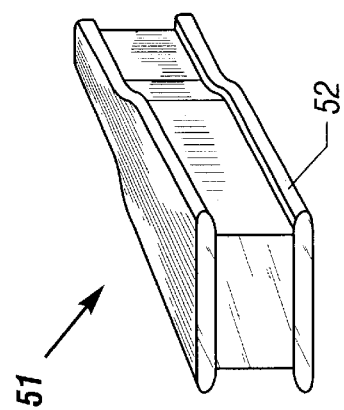
FIG. 4A
FIG. 4B
FIG. 4C
FIG. 5

GAME CALL CARRYING SYSTEM

FIELD OF THE INVENTION

This invention pertains to the field of hunting accessories. More particularly the invention pertains to apparatus for storing, carrying and protecting a variety of game calls, or the like, while not in use or while in the field, by a hunter.

BACKGROUND OF THE INVENTION

Hunters frequently use game calls to attract turkeys, ducks, geese or other game birds. Three common calls used by turkey hunters are the box call, the push button yelper and the slate/glass call. The box call usually comprises an elongated wooden or plastic open top box. A separate piece of wood or plastic which is longer than the box is attached over the open top by a fixed pivot and spring mechanism on one end. This mechanism allows the top piece to pivot from side to side and be dragged across the top rim of the open box. This causes various vibrational modes of the box to imitate sounds of a turkey. The push button yelper usually comprises a smaller wooden or plastic box which fits in the palm of the hand. It has a secondary bottom with holes for sound resonance. A pointed, cone-like, device is attached to the secondary bottom. This device points up toward the open top of the call. A spring tensioned stick runs at an angle through opposite ends of the box and has a flat piece of wood or plastic attached to it. When the stick is pushed, the flat piece of wood or plastic drags across the pointed cone and makes the desired sounds of a turkey. The slate/glass call is usually comprised of a slate or glass plate affixed to the top of a shallow, wooden or plastic pot/bowl. Holes in either the pot itself or in a secondary, spaced apart bottom, result in resonance of turkey sounds when a striker or stick made of various material such as wood or plastic is dragged or pushed across the slate or glass plate.

In the field, a turkey hunter may wish to carry one or more of these calls. Similarly duck, goose, and other game hunters may carry several calls. The calls are often carried or activated by hand which allows only one hand for control of the hunter's firearm or bow. If carried in a vest or pocket, the call will likely have to be removed before sitting down to avoid damage or accidental engagement which could result in unintentional or unnatural sounds that alert game to a hunters presence. Many calls are made of precision crafted wood to procure specific sounds or notes and are vulnerable to damage from rain. Wooden as well as plastic calls can be damaged if dropped or sat on, not only while hunting but during transportation to and from hunts. Hunters often transport calls wrapped in clothes in a suitcase or wrapped in rags in an ammo box. When in the field, many hunters ride all terrain vehicles (ATV) or other four-wheel drive vehicles across bumpy, rugged terrain. This calls for the hunter to hold the game call in one hand while driving with the other, which is unsafe. Otherwise the call must somehow be wrapped and secured to the vehicle.

Thus, there clearly exists a need for hands-free carrying of game calls both for safety purposes and for ease of coordination. This need is even greater for younger adolescent hunters. Many younger hunters are new to carrying a weapon afield and may feel unsure of their ability to carry both a firearm and a game call by hand.

The call carrier system of the present invention was developed to address the above described problems and to allow safe and convenient storage, transportation and carrying of the assorted turkey or other game calls by hunters of all degrees of skill.

SUMMARY OF THE INVENTION

The present invention provides a call carrying system which is rugged, inexpensive, convenient to use and which is adaptable to a plurality of calls. In a preferred embodiment, a tubular receptacle for storing and carrying a variety of turkey game calls including a box call, push button yelper and the slate/glass call, either independently or in combination, as well as duck and goose calls or other calls. The tube is made of sturdy plastic or other rigid material and has a permanent bottom end and slip-on end cap to provide a means of closure. The tube is lined with a cushioned material which holds the game call in place, preventing movement of the game call while inserted inside the tube. The rigidity of the tube helps to prevent damage to the game call from external blows such as being dropped or being sat on. The material used for the tube and end cap is preferably waterproof and protects the game call from the effects of inclimate weather.

The tube is beneficial firstly for storing and protecting a game call in a closet or gun chest during non-use as well as during transportation of calls to and from hunts. In the field, the tube can be carried hands-free, either vertically or horizontally on a hunters belt by means of an attached clip-type or belt loop apparatus. The tube can also be positioned vertically on the outer thigh by an elongated belt loop strap and one or more straps around the thigh, which are fastened directly to the tube or to a rigid carrying sleeve which the tube slips into. The thigh method also allows for hands free carrying and avoids obstructions from other items attached to the belt and from longer than waist length coats. The tube can also be attached by brackets to the handlebars or racks on an ATV, or to the overhead area, inside of doors, underside of seats or virtually anywhere in any vehicle used for hunting or to travel to and from hunting.

1. A separate tube sized for carrying the box call is an elongated rectangular shaped tube with fitted cushioned lining and a removable end cap. The box call is inserted and pushed into the open end of the tube until flush with the opening rim. The end cap is slid onto either the open end for closure, or onto the bottom of the tube when the call is in use. Most box calls are of similar size and shape, thus, the exterior shape of the tube can remain basically consistent. However, slight variations of the shape and thickness of the cushioned lining may be made to accommodate some models and for fitting custom made calls. The tube can also be fitted with a screw-on, u-shaped bracket, which when attached to the outer surface of the tube, will allow a box call having a bottom plate to slide in and down, and be secured in place on the outside of the tube for one-handed operation. Box calls made without a bottom plate could have a plate attached aftermarket by an owner for use in the u-shaped bracket.

2. A second separate tube for carrying the push button yelper is of a similar design as for the box call, only slightly shorter and with a different shaped, cushioned lining to accommodate the shape of the body of the yelper and the push button stick or striker rod. The end cap is slid onto either the open end for closure or onto the bottom of the tube when the call is in use. Most push button yelper calls are of similar size and shape, thus, the exterior shape of the tube remains basically consistent. However, slight variations of the shape and thickness of the cushioned lining may be made to accommodate some models and for fitting custom made calls. Push button yelper calls can be operated with one hand while only partially removed from the tube. The push button yelper may also have an aftermarket bottom plate attached to it if feasible, for use with a screw-on, u-shaped bracket. When the u-shaped bracket is attached to the outer surface of the tube, it will allow the yelper call to be secured in place on the outside of the tube for one-handed operation.

3. A third separate tube for carrying the slate and/or glass call comprises a more square and thinner tube, sized for the call and also has a cushioned lining to secure and protect the call. The slate or glass call slides into the open top and is pushed downward into the tube. The end cap is slid onto either the open end for closure or onto the bottom of the tube when the call is in use. This tube may have a small rigid ring-type protrusion molded on the thin edge of the tube. The stick/striker for the call is slid into the ring and securely held in place when the end cap is on or off. Most slate/glass calls are of similar size and shape, thus, the exterior shape of the tube can remain basically consistent. However, slight variations of the shape and thickness of the cushioned lining may be made to accommodate some models and for fitting custom made calls. The tube may also be fitted with a screw on, u-shaped bracket, which when attached to the outer surface of the tube, will allow the slate/glass call to be secured in place on the outside of the tube for one-handed operation.

The invention may best be understood by reference to the following detailed description thereof, when taken in conjunction with the accompanying drawings.

BRIEF DESCRIPTION OF THE DRAWINGS

FIGS. 1A, 1B and 1C, are schematic perspective views showing a system for carrying game calls according to the invention and includes several means for carrying by a hunter.

FIG. 2 shows a schematic side view of one embodiment of a tube shaped call carrier having a plurality of carrying means.

FIG. 3 is a schematic side view showing a tube carrying sleeve for carrying a plurality of tube shaped call carriers simultaneously by a hunter.

FIGS. 4A, 4B and 4C show in a schematic perspective side view, a second embodiment of a call carrying tubular member having a custom fitted call securing means therein. And;

FIG. 5 is a schematic side view, partially in section, showing a third embodiment of a call carrier tube for smaller calls, according to the invention.

DETAIL DESCRIPTION OF THE PREFERRED EMBODIMENT

Referring initially to FIG. 1A, a call carrier tube 11 is shown in a schematic perspective view. The tube 11 has a dosed end 12 and an open end 13 and has relatively thin sidewalls. Tube 11 is provided on its exterior surface with a circumferential ridge 14 which effectively enlarges its diameter at this plane. A removable end cap 15 is sized to slip over the open end 13 of tube 11 or to slip on the closed bottom end 12 if desired to leave the top end 13 open.

FIG. 1B shows a sleeve 11A sized to receive tube 11 and having a strap carrying system for carrying carrier tube 11. Nylon web carrying straps 16, 17, and 18 are provided and are affixed to the exterior surface of sleeve 11A in any convenient fashion, such as by cement, rivets, or the like. Straps 16 and 17 are dual leg straps and are provided with convenient snap fasteners 19, 20 as shown. Strap 18 is provided with snap fastener 21, 22 which separates its top end from that affixed to carrier tube 11. The upper end of strap 18 forms a loop through which a hunter can pass his belt. FIG. 1C schematically shows how the carrying sleeve 11A is affixed to a hunter and has call carrier tube 11 inserted therethrough. The call carrier may be withdrawn from carrier sleeve 11A with no snaps or fasteners needing to be undone.

Referring now to FIG. 2 a call carrier tube 11 of this same type shown in FIG. 1A and having an open end 13, a closed end 12 and a removable top 15 is shown schematically. In FIG. 2 carrying means are attached to the carrier tube 11 body member directly. Belt sized loop openings 29 are provided and could be loops of the wall material of tube 11 punched outwardly from inside, or could be external metal belt loops if desired. A spring-hinged clip 28 is provided to clip around the belt of a hunter if it is desired to carry tube 11 vertically. A hunter's belt drawn through loops 29 provides a means for horizontal carry.

Referring now to FIG. 3 a dual call carrier tube carrying sleeve 31A, 32A is shown schematically. A single dual passage sleeve 31A, 31B has dual passages sized to receive two different sized call carrier tubes 31 and 32. The dual sleeve 31A, 32A corresponds to the single passage carrier sleeve 11 A of FIG. 1B. Then straps 36, 37 (leg straps) and 38 (belt straps) are provided similarly as previously described. The strap carrying system shown in FIG. 3 is thus affixed to a hunter in the same manner as shown in FIG. 1C.

Referring now to FIG. 4A a box type call 51 (as shown in FIG. 4C) has a special carrying plate 52 affixed to a non-sound making surface as shown. Carrier tube 41 is generally of the same type as described previously with an open top end 43 and a dosed bottom end 42. A removable top 45 is sized to close open end 43 by sliding on only the exterior surface of tube 41. A bracket receptacle 46 is attached to the outside surface of carrier tube 41 or to the exterior of a slip in carrying sleeve 47 if desired. The bracket 46 has a closed end 48 on its downward end and an open end 49 on its upper end. The receptacle 46 is sized cooperatively to receive the special bottom plate 52 attached to call 51. Thus, in the field, call 51 can be removed from its carrier tube 41 or sleeve/tube, 46/41, and inserted into receptacle 46 where it will bottom out against closed end 48 thereof. The call may then be operated by the hunter with one hand while held in this manner.

Finally referring now to FIG. 5 a disc shaped state or glass plate call carrier is shown schematically in section. The carrier tube 62 has an open end 67 and a closed end 68 and has a relatively thin wall 62. The interior of tube 62 is sized to contain a slate or glass plate call 61 (as shown) and is lined with a cushioning material 63 such as foam rubber, urethane foam or the like, as desired. Such cushioning layers as 63, as will be appreciated by those of skill in the art, can similarly be installed interiorly to the carrier tubes of FIGS. 1–4 as desired. The exterior of carrier tube 62 is provided with a striker loop 66 affixed thereto and sized to snugly slide against a paddle shaped striker 65 which is used in conjunction with the slate or glass plate 61 to activate the call. The carrier tube 62 can be carried or affixed to a vehicle as desired in any manner similar to those discussed previously.

In summary the present invention provides a complete, inexpensive, rugged game call carrying system for one or a plurality of game calls. It can be used by a person or attached to a vehicle as desired. It provides watertight cover and full protection for the carried calls and is safe, and easy to use.

What is claimed is:

1. A system for carrying and protecting wild game calls, comprising:
    at least one relatively thin walled solid tubular call receptacle member having an open end and a closed end, said at least one receptacle member being of a size to snugly receive a wild game call, said at least one receptacle member including a cover capable of slidably fitting over the open end and the closed end of the at least one receptacle member, said at least one receptacle member including a raised ridge having a first diameter and remaining portions of the at least one receptacle member having a second diameter which is smaller than the first diameter;
    at least one relatively thin walled solid sleeve member open at both ends, said at least one sleeve member having a diameter slightly greater than the second diameter to snugly receive the at least one receptacle member, said raised ridge preventing further movement of the at least one receptacle member within the at least one sleeve member when said raised ridge engages said at least one sleeve member;
    said at least one sleeve member including means for attaching the at least one sleeve member and the at least one receptacle member to a person.

2. The system of claim 1 wherein
said means for attaching includes a strap with a belt loop and at least one leg strap.

3. The system of claim 1 wherein
said means for attaching includes a spring hinged clip.

4. The system of claim 1 wherein
said means for attaching includes a plurality of belt loops.

5. The system of claim 1 wherein
said means for attaching includes a spring hinged clip oriented to attach the at least one sleeve member in a vertical direction and a plurality of belt loops oriented to attach the at least one sleeve member in a horizontal direction.

6. The system of claim 1 wherein
said receptacle member and said cover includes cushioning disposed on the interior of the receptacle member and the cover.

7. The system of claim 1 wherein
said at least one sleeve member includes a plurality of sleeve members and said at one receptacle member includes a plurality of receptacle members adapted to be received in the plurality of sleeve members.

8. The system of claim 1 wherein
an exterior surface of said at least one sleeve member includes a bracket adapted to receive a complimentary securing element formed on a game call.

9. The system of claim 1 wherein
an exterior surface of said at least one sleeve member includes an additional receptacle member attached thereto, said additional receptacle member sized to receive a game call.

10. The system of claim 9 wherein
said additional receptacle member including a holder extending therefrom to receive one component of a multi-component game call.

11. The combination of the system as set forth in claim 1 and at least one game call.

12. The combination of the system as set forth in claim 2 and at least one game call.

13. The combination of the system as set forth in claim 3 and at least one game call.

14. The combination of the system as set forth in claim 4 and at least one game call.

15. The combination of the system as set forth in claim 5 and at least one game call.

16. The combination of the system as set forth in claim 6 and at least one game call.

17. The combination of the system as set forth in claim 7 and at least one game call.

18. The combination of the system as set forth in claim 8 and at least one game call.

19. The combination of the system as set forth in claim 9 and at least one game call.

20. The combination of the system as set forth in claim 10 and at least one game call.

\* \* \* \* \*